United States Patent [19]

Parsons

[11] Patent Number: 4,640,495

[45] Date of Patent: Feb. 3, 1987

[54] DEVICE FOR MOVING AN AUTOMOBILE WITH DISABLED WHEELS

[76] Inventor: David M. Parsons, Box 14, Antigo, Wis. 54409

[21] Appl. No.: 694,354

[22] Filed: Jan. 24, 1985

[51] Int. Cl.[4] .......... B66F 3/00; B60P 1/48

[52] U.S. Cl. .......... 254/8 B; 254/134

[58] Field of Search .......... 254/133, 134, DIG. 1, 254/DIG. 4, 100, 8 B, 2 B; 269/17, 76

[56] References Cited

U.S. PATENT DOCUMENTS

| | | | |
|---|---|---|---|
| 885,302 | 4/1908 | Smith . | |
| 949,331 | 2/1910 | Scholle . | |
| 957,536 | 3/1910 | Baker . | |
| 1,513,217 | 10/1924 | Bunker . | |
| 2,568,827 | 9/1951 | Schallock | 254/134 |
| 2,702,689 | 2/1955 | Smith . | |
| 2,747,837 | 5/1956 | Turner | 254/134 |
| 2,962,262 | 11/1960 | Garver et al. | 254/134 |
| 3,005,640 | 10/1961 | Cole . | |
| 3,091,431 | 5/1963 | Arnes et al. | 254/134 |
| 3,245,659 | 4/1966 | Nolden | 254/134 |
| 3,541,598 | 11/1970 | Dousett . | |
| 3,834,669 | 9/1974 | Reid | 254/133 R |
| 4,066,243 | 1/1978 | Johnson | 254/133 R |
| 4,184,645 | 1/1980 | Starling | 269/76 |
| 4,336,921 | 6/1982 | Wienhold | 254/8 B |
| 4,427,178 | 1/1984 | Kozlowski . | |

*Primary Examiner*—Robert C. Watson

*Attorney, Agent, or Firm*—Isaksen, Lathrop, Esch, Hart & Clark

[57] ABSTRACT

A moving device for moving automobiles with disabled wheels, the moving device to be used in conjunction with a conventional floor jack. The moving device includes a jack dolly having wheels upon which the jack dolly can be moved and securing means for securing the floor jack on the jack dolly. A cradle is provided having retaining means for retaining the cradle on the distal end of the jack arm in pivoting relation thereto. The cradle further has engaging means for engaging the cradle with the automobile frame or equivalent part. The cradle may be engaged with the automobile frame at a selected location thereon and the jack arm of the floor jack may be raised to lift the disabled wheels so that the automobile may be moved by moving the jack dolly on the dolly wheels.

12 Claims, 5 Drawing Figures

Fig 4
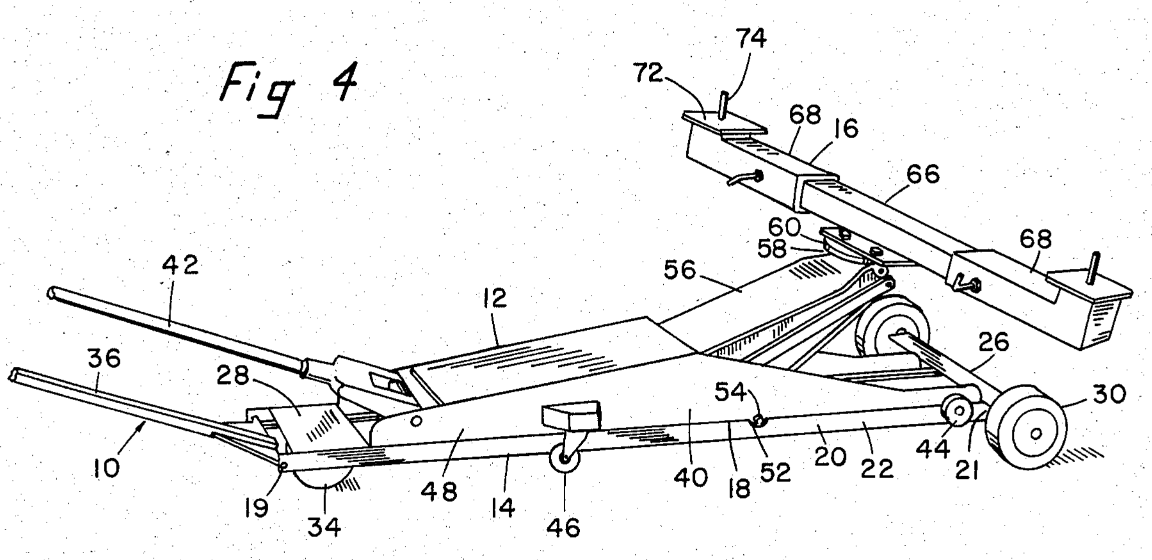
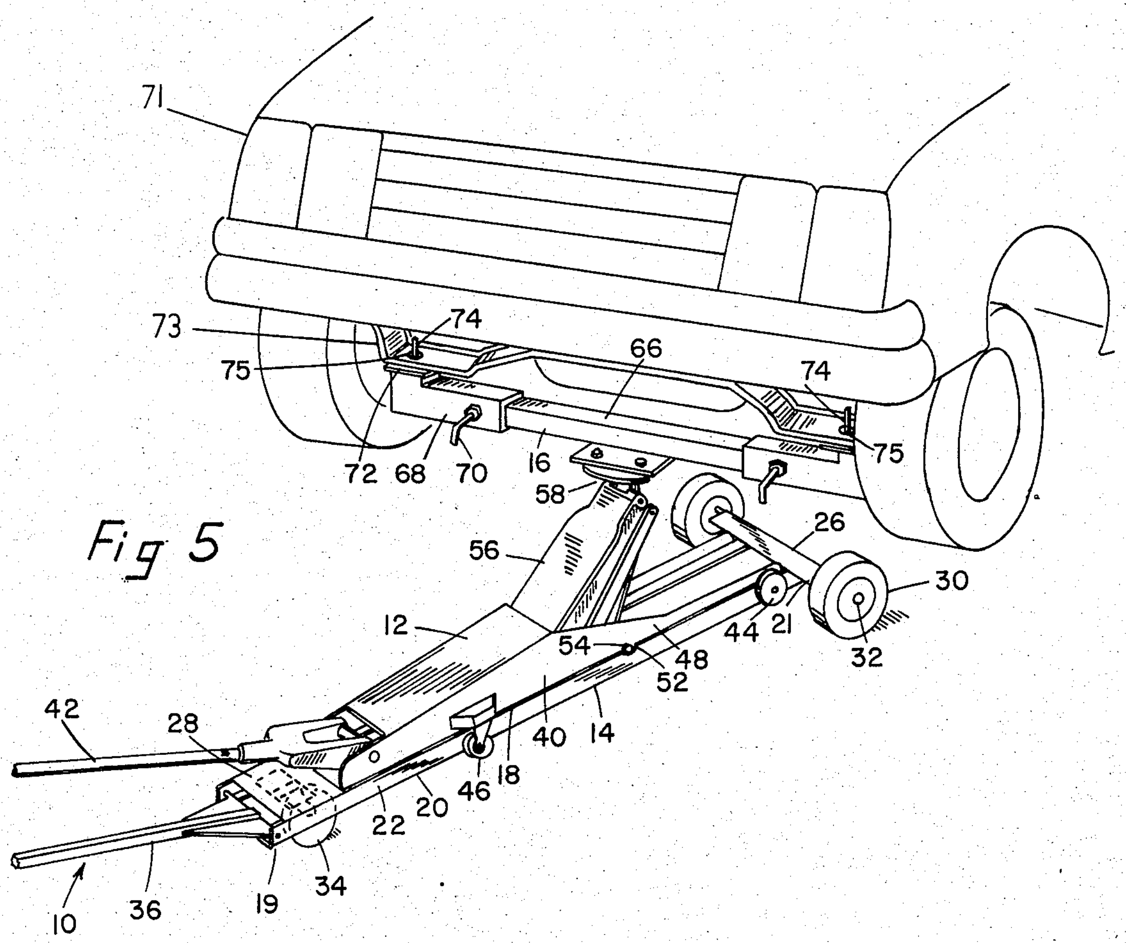
Fig 5

DEVICE FOR MOVING AN AUTOMOBILE WITH DISABLED WHEELS

TECHNICAL FIELD

The present invention relates to devices for moving automobiles generally and, in particular, for devices for moving automobiles one set of whose wheels are immobilized.

BACKGROUND OF ART

In various circumstances it is desirable that automobiles be moved when either their front or rear wheels are incapable of turning. Most typically, repair shops engaged in the repair of a front wheel-driven automobile find themselves required to move the automobile after the front wheels or related power train are so disassembled as to make it impossible to steer the automobile with the front wheels or even to roll the automobile thereon. Often such automobiles are constructed with a "unitized" body having no separate frame. A front subframe supports the engine, drive train components. and front suspension. With the front subframe removed in order to undertake certain repairs on these parts, the remaining frame lacks the structural strength necessary to move the car with a wrecker.

Thus, an operator of a repair shop, having discovered that, for instance, a replacement part must be ordered with the result that repairs underway cannot be completed for several days, is faced with the necessity of either reassembling a partially disassembled automobile so that it can be moved to a storage area, leaving the automobile to occupy a bay within his facility, or finding a means alternative to a tow truck or the vehicle's own wheels by which to move it. No simple and inexpensive means is currently available to allow such a disabled automobile to be moved conveniently without resort to the automobile's own wheels.

In contrast to the unavailability of means for moving an automobile in the manner discussed above, nearly every repair shop owns a hydraulic floor jack for jacking up one end or another of an automobile. Such jacks are frequently equipped with at least one set of wheels, allowing the jack to be conveniently moved from place to place across the floor of a repair shop, a concrete apron, or the like.

Those skilled in the art are aware of a variety of such jacks for lifting automobiles or other heavy objects. Examples include, Smith, U.S. Pat. No. 885,302 (for use with railroad trucks), and Bunker, U.S. Pat. No. 1,513,217. Scholle, U.S. Pat. No. 949,331, and Dousset, U.S. Pat. No. 3,541,598 show wheeled jacks adapted to lift relatively wide objects by applying pressure simultaneously at separated points. Baker, U.S. Pat. No. 957,536, Smith, U.S. Pat. No. 2,702,689, and Cole, U.S. Pat. No. 3,005,640 all show wheeled lifting devices or dollies adapted for use in turning or moving heavy objects from place to place. None of the patents cited show an accessory device for receiving a wheeled floor jack to render it mobile under specialized conditions. Kozlowski, U.S. Pat. No. 4,427,178 shows an accessory for a wheeled floor jack adapted to distribute the weight being lifted by the jack over a considerable area and to keep the wheels of the jack from sinking into or otherwise interacting with the underlying surface.

BRIEF SUMMARY OF THE INVENTION

The moving device of the invention for moving automobiles with disabled wheels, such automobiles having an automobile frame, is to be used in conjunction with a conventional floor jack having a jack arm with a distal end that may be raised and lowered. The moving device includes a jack dolly including dolly wheels upon which the jack dolly can be moved together with securing means for securing the floor jack on the jack dolly. The moving device further includes a cradle having a retaining means for retaining the cradle on the distal end of the jack arm in pivoting relation thereto and engaging means for engaging the cradle with the automobile frame. By these means, the cradle may be engaged with the automobile frame at a selected location thereon and the jack arm of the floor jack may be raised to lift the disabled wheels so that the automobile may be moved by the jack dolly on the dolly wheels.

The method of the invention for moving a vehicle with a disabled set of wheels includes securing a conventional floor jack, having a jack arm with a distal end that may be raised and lowered, on a jack dolly having wheels upon which the jack dolly can be moved, the wheels of the jack dolly having a size selected to be sufficiently large to conveniently roll over anticipated ground irregularities and obstacles. The method further includes retaining a cradle on the distal end of the jack arm in pivoting relation thereto, elevating the jack arm, and engaging the cradle with a selected, strong portion of the automobile to be moved at a location proximate to the disabled set of wheels. Then the jack arm is elevated further to lift the set of wheels clear of the ground, and the jack dolly is moved to thus move the automobile.

A primary object of the invention is to provide moving means for moving an automobile without resort to use either of its front set of wheels in the one instance or its rear set of wheels in the other, whereby the set of wheels not used may be in a locked, disassembled, or otherwise inoperative state.

A second object of the invention is to provide for such a moving means in which the automobile is held in a stable, secure fashion.

Another object of the invention is to provide such a moving means capable of conveniently moving such an automobile over the ground or other slightly irregular surfaces.

A further object of the invention is to provide such a moving means that is inexpensive to manufacture and that, therefore, may be made available in the market relatively inexpensively.

Yet another object of the invention is to provide such a moving means having a minimum of moving parts and no hydraulic or other lifting mechanism of its own.

A further object of the invention is to provide such a moving means capable of being stored in a compact and convenient form.

Another object of the invention is to provide a method of moving automobiles without resort to use of one of the front or rear sets of wheels of the automobile.

Other objects, features, and advantages of the invention will be apparent from the following detailed description taken in conjunction with the accompanying drawings showing a preferred embodiment of a device for moving an automobile with disabled wheels.

BRIEF DESCRIPTION OF THE DRAWINGS

FIG. 4 is a perspective view of the moving device of the invention with a conventional hydraulic floor jack mounted therein.

FIG. 5 is a perspective view of the moving device of the invention, in which is mounted the hydraulic floor jack shown in FIG. 4, with the cradle engaged in the frame of an automobile to be moved.

DETAILED DESCRIPTION OF THE PREFERRED EMBODIMENT

Figure 1:
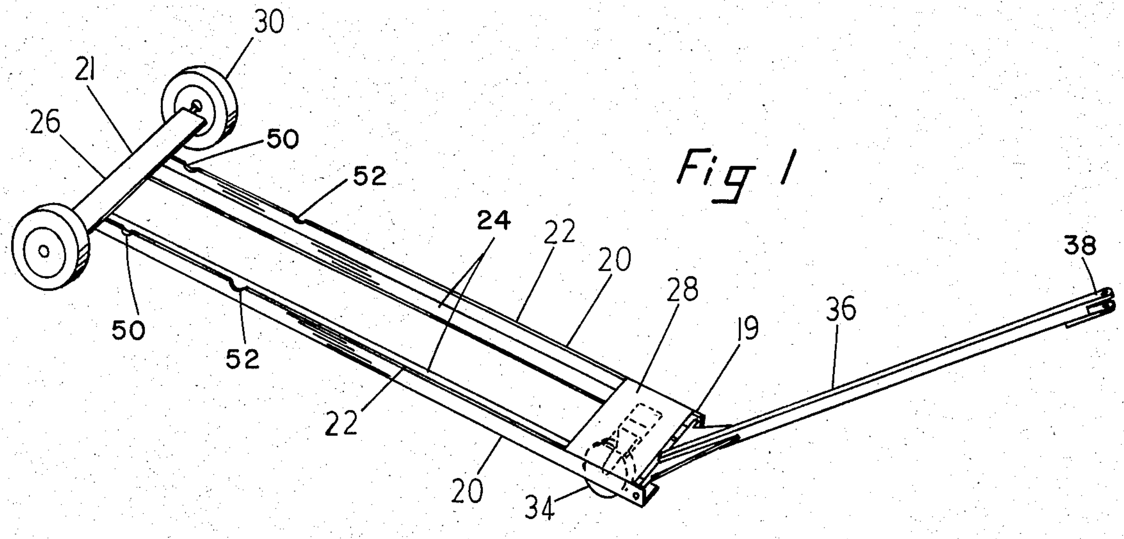
FIG. 1 is a perspective view of the jack dolly portion of the preferred embodiment of the device of the invention for moving an automobile with disabled wheels.

Referring more particularly to the drawings, wherein like numbers refer to like parts, FIG. 4 shows a device for moving a disabled front wheel drive automobile constructed in accord with the present invention, as is indicated generally at 10, in which figure a conventional hydraulic floor jack 12 is shown mounted in the moving device. The moving device 10 includes a jack dolly 14 and a cradle 16. In general terms, the floor jack 12 is carried by the jack dolly 14, and the cradle 16 is mounted on the floor jack.

The jack dolly 14 has a longitudinally extended box 18. The box 18 has a front end 19, a rear end 21, and opposed side pieces 20 that extend from front to rear for substantially the length of the box. The side pieces 20 have side members 22 extending generally vertically and floor members 24, the floor member of each side piece extending toward the opposed side piece. The box 18 also has a rear cross brace 26 and a front cross brace 28. The rear and front cross braces 26, 28 extend between the side members 22 and hold them in rigid relation with respect to each other.

The jack dolly 14 is equipped with wheels that allow it to be rolled over a surface and to be steered. Preferably these wheels include rear wheels 30 mounted on a common axle 32 that extends transversely and is rigidly attached to the box 18. The wheels further include a front wheel 34, preferably attached to the front cross brace 28. Preferably the front wheel 34 is a caster-type swivel wheel of conventional design, as is shown in phantom in FIGS. 1 and 5.

The jack dolly 14 also includes a draw bar 36 pivotably attached to the front end 19 of the box 18. The pivotable attachment of the draw bar 36 to the box 18 is such that the draw bar can freely pivot about an axis transverse to the longitudinally extended box. The draw bar 36 includes a hitch 38 at a point remote from its pivotable attachment to the box 18.

It will be apparent from the above description that the jack dolly 14 can be pulled or pushed by means of the draw bar 36 and that a laterally directed pressure on the draw bar will cause the front wheel 34 to pivot, allowing the jack dolly to be steered toward either side. Equivalent, alternative structures to accomplish the same ends are apparent and include arrangements wherein a front wheel or wheels are rigidly attached to the box 18, and a rear wheel or wheels are adapted to pivot generally in the manner of a caster-type wheel. Similarly, the front wheel 34 can be rigidly mounted to a plate or comparable structure that is itself pivotably attached to the box 18. With the draw bar 36 then attached to the plate, a steerable jack dolly 14 results. These and all such equivalent, alternative embodiments of the invention are included within the scope and spirit thereof.

As is disclosed above, the box 18 is adapted to receive and hold a conventional floor jack 12. Securing means are provided for securing the floor jack 12 and substantially preventing sideways and front to rear movement of the floor jack 12 with respect to the jack dolly 14. Preferably the floor jack 12 is substantially contained and supported within the box 18, resting on the floor members 24 of the side pieces 20. In such an arrangement, the opposed side pieces 20 may be spaced from each other at a distance such that the side members 22 of the side pieces snugly enclose a selected portion of the floor jack 12. Similarly, the distance between the rear cross brace 26 and the front cross brace 28 may be selected to snugly enclose the floor jack 12 from front to rear. Such a spacing of the side pieces 20 and the rear and front cross braces 26, 28 constitutes an example of securing means.

Conventional floor jacks such as the floor jack shown at 12 in the figures tend to have certain features in common. Thus, the floor jack 12 has a body 40, a jack handle 42, and wheels including rear jack wheels 44 and front jack wheels 46. Typically, the floor jack body 40 has jack sides 48, and the rear and front jack wheels 44, 46 extend to the side, beyond the jack sides. It is common that either the rear or the front jack wheels 44, 46 are caster-mounted wheels. In the jack 12 shown in the figures, the front jack wheels 46 are so mounted. Typically, such jack wheels 44, 46 are of a relatively small diameter sufficient to allow the floor jack 12 to be conveniently rolled from place to place over a hard surface, such as a concrete floor. Such jack wheels must be strong enough to bear the weight of the automobile or other object being lifted by the floor jack 12, but it is not generally expected that the floor jack will be used to both elevate a heavy object and transport it across a floor or the ground. When heavily loaded, such jack wheels 44, 46 are difficult or even impossible to pull over cracks or other irregularities of a floor and tend simply to sink into the gravel or soil of an unpaved surface.

Figure 2:
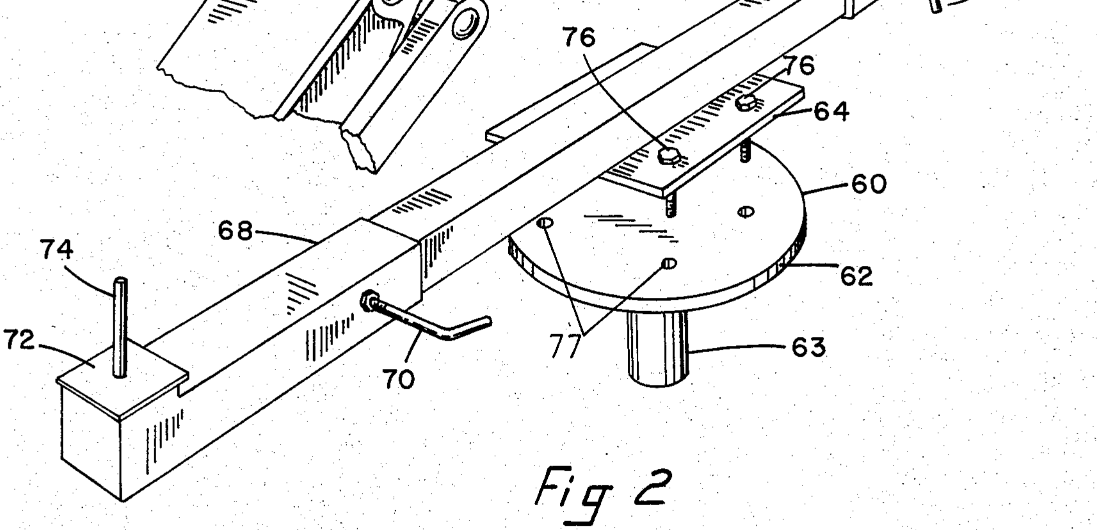
FIG. 2 is a perspective view of the cradle of the preferred embodiment of the device of the invention for moving an automobile with disabled wheels showing the lift pad of a conventional floor jack in exploded relation thereto.

Preferably, the distance between the side members 22 of the box 18 is such that the floor jack body 40 snugly fits therebetween. The side members 22 include such notches as may be necessary to accommodate any parts of the floor jack 12 that extend beyond the floor jack body 40 in such a way as to interfere with the placement of the floor jack 12 within the box 18. Typically, rear jack notches 50 are required to accommodate the rear jack wheels 44. Secondary notches such as those shown at 52 may be necessary to accommodate other parts that project beyond the jack sides 48, such as the bolt shown at 54. Preferably, the rear jack notches 50 are made to snugly fit either the rear jack wheels 44 or their axle, further restraining movement of the floor jack 12 to the front or rear of the box. Thus, notches such as the rear jack notches 50 effectively function as alternative embodiments of the securing means. Conventionally, floor jacks 12 include a jack arm 56 having a distal end 58 that moves upwardly and downwardly as the jack is used. Typically, a lift pad is attached to the distal end 58 of the jack arm 56, as is shown at 60 in FIGS. 4 and 5. The lift pad 60 is pivotably attached to the distal end 58 of the jack arm 56, so that it can remain horizontal or otherwise fixed in attitude as the jack arm is moved up and down. In addition, the lift pad 60 is generally capable of rotating freely around a vertical axis central to the lift pad. Commonly, the lift pad 60 includes a lift pad body 62 extending horizontally for a selected distance and frequently generally disk shaped, as is best shown in FIG. 2. A generally cylindrical pad pin 63 extends downwardly from the lift pad body 62. The distal end 58 of the jack arm 56 has a pin socket 65, shown in phantom in FIG. 3, adapted to receive the pad pin 63. Commonly, the pad pin 63 simply rotates within the pin socket 65 to allow the lift pad 60 to rotate about a vertical axis, as is described above.

The cradle 16 of the moving device 10 of the invention includes a cradle support pad 64 adapted to be supported by the floor jack 12. A longitudinally extended fixed member 66 is fastened to the cradle support pad 64 and is supported thereby. Adjustable members 68 are supported by the fixed member 66. The adjustable members 68 are adapted to slide on the fixed member 66 in proximal and distal directions parallel to the longitudinal axis of the fixed member.

A set screw 70 is provided to lock the adjustable members 68 of the cradle 16 into place at a desired location on the fixed member 66. Preferably each set screw 70 is threadedly engaged in the adjustable member 68 with which it is associated, extending therethrough to contact the fixed member 66. When the set screw is turned, it may be caused to press against the fixed member 66 to releasibly lock the adjustable member 68 in place. Clearly it would be possible to use instead unthreaded pins matingly engaged in holes bored through an adjustable member 68 and one or more corresponding holes bored in the fixed member 66. Other means for locking the adjustable members in place upon the fixed member are possible. All of them are included within the scope and spirit of the present invention.

Each adjustable member 68 has an upwardly presented automobile frame support pad 72. Preferably the automobile frame support pad 72 is located at or near the distal end of the adjustable member 68. The automobile frame support pad 72 includes engaging means for engaging the frame of an automobile to be moved such as the frame shown at 73 of FIG. 5 of the automobile 71. Automobile frames and the bodies of automobiles constructed with unitized bodies tend to be provided with a number of downwardly opening frame holes 75 located at the under and outer edges of the automobile. During manufacture, such frame holes 75 provide a convenient place for the manufacturer to engage the automobile frame 73 for purposes of lifting or turning it. For simplicity of description, only the use of the invention with an automobile 71 having a frame 73 with frame holes 75 will be discussed below. However, the moving device 10 is equally useable with an automobile having a unitized body. Such bodies have downwardly opening holes similarly used during manufacture as a place to engage the body for lifting, holes useable for purposes of the moving device 10 in a manner identical to the use of the frame holes 75 disclosed below. Thus, the term "automobile frame" shall be understood herein to include as an equivalent to the part of a unitized body contributing strength thereto.

The preferred embodiment of the means for engaging the automobile frame 73 referred to above utilizes these frame holes 75. The engaging means includes a frame pin 74 extending upwardly from each automobile frame support pad 72. Each frame pin 74 is adapted to be engaged within a selected hole 75 in the automobile frame 73. The adjustable members 68 may be adjusted longitudinally on the fixed member 66 to accommodate the distance between such frame holes 75 on the particular automobile 71 to be moved. The particular frame holes 75 utilized are selected to be near the inoperative automobile wheels. In an automobile with a unitized body, suitable holes are commonly found in the cowling at or near the location of the fire wall. Such holes are adequately proximate to the front set of wheels of such an automobile.

Figure 3:
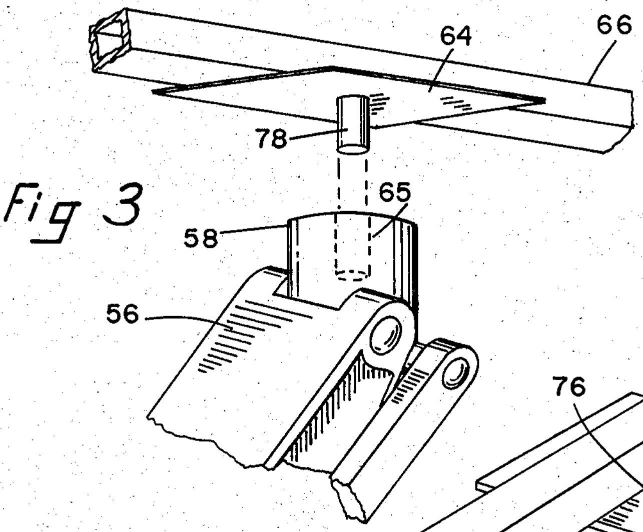
FIG. 3 is a perspective view of a broken away portion of an alternative embodiment of the cradle of FIG. 2, with the distal end of a jack arm shown in exploded relation thereto.

Preferably the frame pins 74 are spring mounted so as to be depressable longitudinally to a withdrawm position flush with the frame support pads 72. The frame pins 74 so mounted are wquipped with pin retaining means such as a spring catch for releasably retaining the frame pins 74 in the withdrawn position. The withdrawn position is especially convenient when the cradle 16 is being positioned beneath the automobile. The cradle support pad 64 includes retaining means for retaining the cradle support pad on the distal end 58 of the jack arm 56 in pivotable relation about a vertical axis. In one preferred embodiment, the retaining means includes threaded cradle locator bolts 76 extending downwardly through the cradle support pad 64 in freely turning relation. The cradle locator bolts 76 are adapted to be threadedly engaged in holes 77 drilled and tapped expressly for the purpose in the lift pad 60 of the floor jack 12, as may be seen in FIG. 2. By means of the cradle locator bolts 76, it is thus possible to rigidly attach the cradle 16 to the lift pad 60, which itself is capable rotating about a vertical axis, as is discussed above. Alternatively, a central locator pin 78, as shown in the embodiment of FIG. 3, may be rigidly attached to the cradle support pad 64 and extend downwardly therefrom. When this embodiment of the retaining means is employed, the lift pad 60 of the floor jack 12 is entirely removed, and the central locator pin 78 is inserted into the pin socket 65 of the floor jack, to pivot therein about a vertical axis.

In use, when it is desired to move an automobile without use of one set of its wheels, a floor jack 12 is secured within the box 18 of the jack dolly 14, with the rear jack wheels 44 engaged in the rear jack notches 50 and any remaining parts projecting from the floor jack body 40 similarly accommodated by secondary notches 52. The wheels 30, 34 of the jack dolly 14 are selected to be sufficiently large to conveniently roll over anticipated ground irregularities and obstacles. The cradle 16 is then mounted on the distal end 58 of the jack arm 56 to be retained thereon by a retaining means in accord with a disclosure above.

The adjustable members 68 of the cradle 16 then are adjusted until the frame pins 74, preferably in the withdrawn position, are aligned with the frame holes 75 to be utilized in the automobile frame 73. The adjustable members 68 are then locked into place by use of the set screws 70. By use of the draw bar 36, the jack dolly 14 then can be rolled under the automobile 71 to be moved until the frame pins 74 are located beneath the selected frame holes 75. The jack arm 56 of the floor jack 12 can then be raised in the conventional way by use of the jack handle 42 and the frame pins 74 snapped up into place, to engage the cradle with a selected, strong portion of the automobile, at a location proximate to the disabled set of wheels. As the automobile frame support pads 72 come into contact with the automobile frame 73, the automobile 71 can be lifted until the inoperable automobile wheels clear the ground.

With the automobile 71 so lifted, the jack dolly 14 can be pulled by hand or by any motorized vehicle having a trailer hitch, a step bumper, or the like attached to the hitch 38, drawing the automobile along as a consequence. When the jack arm 56 of the floor jack 12 is lowered, the frame pins 74 disengage from the automobile frame 73, and the cradle 16 is lowered to the point where it can be freely withdrawn from under the automobile. Although FIG. 5 shows the front set of automobile wheels being lifted by the moving device 10, it will be apparent that inoperative rear automobile wheels could be as easily lifted.

It will be apparent that the floor jack 12 can be easily removed from the jack dolly and cradle 16, leaving it available for other, conventional uses. The draw bar 36 of the jack dolly 14 is adapted to pivot freely backward over the box 18 to assume a folded, compact configuration convenient for storage in a limited space. The cradle 16 is similarly compact. Thus, the moving device 10 of the invention, when used in combination with a floor jack 12, provides a repair shop with a device for moving disabled front wheel drive automobiles that may be economically stored and is simple enough in design to be inexpensively manufactured and sold. Because virtually every repair shop has an hydraulic floor jack 12, the moving device 10 of the invention allows such a repair shop to utilize an hydraulicly assisted lifting and moving device without having to purchase and maintain a hydraulic system additional to what would normally already be available in the shop.

All parts of the moving device 10 of the invention may be manufactured from steel or other suitably strong materials by conventional methods. The rear wheels 30 and front wheels 34 must be sufficiently strong to bear the weight of the automobile to be lifted and must have a diameter selected to be large enough to conveniently pass over obstacles and other unevennesses to be anticipated in the floor or ground over which the automobile is to be moved. Although the disclosed methods and materials are preferred, it will be apparent that other materials and methods of manufacture are possible. Consequently, it is understood that the present invention is not limited to the particular construction and arrangement of parts illustrated and disclosed above. Nor is the method of the invention limited to the steps set forth above. Instead, the invention embraces all such modified forms thereof as come within the scope of the following claims.

What is claim is:

1. A moving device for moving automobiles with disabled wheels and having an automobile frames, the moving device to be used in conjunction with a conventional floor jack having a floor jack body, rear jack wheels projecting sidewardly therefrom, and a jack arm with a distal end so that it may be raised and lowered, the moving device comprising:

(a) a jack dolly including wheels upon which the jack dolly can be moved, a securing means for securing the floor jack on the jack dolly, and a longitudinally extended box having a front end, a rear end, and opposed side pieces wherein the securing means includes opposed side members forming part of the side pieces and extending upwardly, the side members being spaced apart from each other by a distance selected to be such that the floor jack snugly fits therebetween and side-to-side movement of the floor jack within the box is constrained, the side members including rear jack notches adapted to snugly engage the rear jack wheels so that movement of the floor jack toward the front and rear ends of the box is restrained; and (b) cradle having retaining means for retaining the cradle on the distal end of the jack arm in pivoting relation thereto, and engaging means for engaging the cradle with the automobile frame so that the cradle may be engaged with the automobile frame at a selected location thereon and the jack arm of the floor jack may be raised to lift the disabled wheels so that the automobile may be moved by moving the jack dolly on its wheels.

2. The moving device of claim 1 wherein the jack wheels of the floor jack include axles and the rear jack notches are adapted to snugly engage the axles.

3. A moving device for moving automobiles with disabled wheels and having an automobile frame, the moving device to be used in conjunction with a conventional floor jack having a jack arm with a distal end so that it may be raised and lowered, the moving device comprising:

(a) a jack dolly including wheels upon which the jack dolly can be moved and securing means for securing the floor jack on the jack dolly, wherein the jack dolly includes a box having a front end and a rear end, and a draw bar attached to the front end of the box in pivoting relation, rotating with respect thereto about a generally horizontal axis lateral to the box, the jack dolly further including rear wheels attached to the box at its rear end and at least one front wheel attached to the box at its front and pivotable with respect thereto about a vertical axis; and (b) cradle having retaining means for retaining the cradle on the distal end of the jack arm in pivoting relation thereto, and engaging means for engaging the cradle with the automobile frame so that the cradle may be engaged with the automobile frame at a selected location thereon and the jack arm of the floor jack may be raised to lift the disabled wheels such that the automobile may be moved by drawing and steering the jack dolly on its wheels over a supporting surface by force applied to the draw bar.

4. The moving device of claim 3 wherein said box is a longitudinally extended box further having opposed side pieces, and wherein the securing means for securing the floor jack on the jack dolly includes opposed side members forming part of the side pieces and extending upwardly, the side members being spaced apart from each other by a distance selected to be such that the floor jack snugly fits therebetween and side-to-side movement of the floor jack within the box is constrained.

5. The moving device of claim 4 to be used when the conventional floor jack includes a floor jack body and rear jack wheels projecting sidewardly therefrom, the side members of the box including rear jack notches adapted to snugly engage the rear jack wheels, so that movement of the floor jack toward the front and rear ends of the box is restrained.

6. The moving device of claim 5 wherein the jack wheels of the floor jack includes axles and the rear jack notches are adapted to snugly engage the axles.

7. The moving device of claim 4 wherein the box includes a rear cross brace and a front cross brace, the front and rear cross braces being located at a distance from each other such that the floor jack snugly fits between them and movement of the floor jack toward the rear end and the front end of the box is restrained.

8. The moving device of claim 3 for use when the conventional floor jack includes a lift pad pivotably attached to the distal end of the jack arm, the lift pad having upwardly opening, threaded holes, wherein the cradle includes a cradle support pad and the retaining means for retaining the cradle on the distal end of the jack arm includes cradle locator bolts extending downwardly through the cradle support pad in freely turning relation to threadedly engage the threaded holes of the lift pad.

9. The moving device of claim 3 for use when the distal end of the jack arm of the floor jack includes an upwardly opening pin socket, the cradle of the moving device including a cradle support pad having a downwardly extending, central locator pin pivotably engagable within the pin socket of the distal end of the jack arm.

10. The moving device of claim 3 for use in moving an automobile, the automobile frame of which has downwardly opening frame holes, the engaging means for engaging the cradle with the automobile frame including an upwardly presented car frame support pad and a frame pin extendable upwardly therefrom, so that the cradle may be engaged with the car frame by the insertion of the frame pin into a selected frame hole thereof.

11. The moving device of claim 10 wherein the cradle includes a longitudinally extended fixed member and adjustable members mounted on the fixed member in movable relation thereof and adjustable on the fixed member in directions parallel to the longitudinal axis thereof, cradle support pads being located on each of the adjustable members.

12. The moving device of claim 11 including a set screw threadedly engaged in each adjustable member and extendable therethrough to lock the adjustable member at a selected location on the fixed member.

* * * * *

UNITED STATES PATENT AND TRADEMARK OFFICE
CERTIFICATE OF CORRECTION

PATENT NO. : 4,640,495

DATED : February 3, 1987

INVENTOR(S) : David M. Parsons

It is certified that error appears in the above-identified patent and that said Letters Patent are hereby corrected as shown below:

Column 1, line 24, "nents." should read --nents,--.

Column 7, line 57, "frames" should read --frame--.

Column 8, line 39, "and" should read --end--.

Column 10, line 16, "thereof" should read --thereto--.

Signed and Sealed this

Twenty-first Day of April, 1987

*Attest:*

DONALD J. QUIGG

*Attesting Officer* *Commissioner of Patents and Trademarks*